US010583557B2

(12) United States Patent
Abdallah et al.

(10) Patent No.: US 10,583,557 B2
(45) Date of Patent: Mar. 10, 2020

(54) REDUNDANT UNDERACTUATED ROBOT WITH MULTI-MODE CONTROL FRAMEWORK

(71) Applicant: GM GLOBAL TECHNOLOGY OPERATIONS LLC, Detroit, MI (US)

(72) Inventors: Muhammad E. Abdallah, Rochester Hills, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 15/429,241

(22) Filed: Feb. 10, 2017

(65) Prior Publication Data
US 2018/0229366 A1 Aug. 16, 2018

(51) Int. Cl.
*B25J 9/16* (2006.01)
*B25J 13/08* (2006.01)
*B25J 19/02* (2006.01)
*B25J 9/00* (2006.01)

(52) U.S. Cl.
CPC ........... *B25J 9/1643* (2013.01); *B25J 9/0081* (2013.01); *B25J 9/1633* (2013.01); *B25J 9/1653* (2013.01); *B25J 13/084* (2013.01); *B25J 13/085* (2013.01); *B25J 13/088* (2013.01); *B25J 19/023* (2013.01); *G05B 2219/39195* (2013.01); *G05B 2219/39212* (2013.01)

(58) Field of Classification Search
CPC ...... B25J 13/084; B25J 13/085; B25J 13/088; B25J 19/023; B25J 9/0081; B25J 9/1633; B25J 9/1643; B25J 9/1653
See application file for complete search history.

(56) References Cited

U.S. PATENT DOCUMENTS

| 6,786,896 B1 * | 9/2004 | Madhani ............... B25J 9/1615 606/1 |
| 8,725,295 B2 | 5/2014 | Okazaki |
| (Continued) | | |

FOREIGN PATENT DOCUMENTS

| DE | 10122142 A1 | 11/2002 |
| EP | 1501754 | 11/2008 |

OTHER PUBLICATIONS

Ali Muhammad, "Impedance Control of Redundant Manipulators", Tampere University of Technology. (Year: 2011).*

*Primary Examiner* — Rachid Bendidi
(74) *Attorney, Agent, or Firm* — Quinn IP Law (57) ABSTRACT

A robotic system includes a jointed mechanism, position sensors, and a controller. The mechanism has an end-effector, and further includes actively-controlled joints and passive joints that are redundant with the actively-controlled joints. The position sensors are operable for measuring joint positions of the passive joints. The controller is in communication with the position sensors, and is programmed to execute a method to selectively control the actively-controlled joints in response to the measured joint positions using force control and/or a modeled impedance of the robotic mechanism. Possible control modes in impedance control include an Autonomous Mode in which an operator does not physically interact with the end-effector and a Cooperative Control Mode in which the operator physically interacts with the end-effector.

15 Claims, 4 Drawing Sheets

(56) References Cited

U.S. PATENT DOCUMENTS

| | | | |
|---|---|---|---|
| 2013/0158709 A1* | 6/2013 | Shi | B25J 5/02 |
| | | | 700/259 |
| 2015/0081099 A1* | 3/2015 | Komatsu | B25J 13/085 |
| | | | 700/258 |
| 2015/0100161 A1* | 4/2015 | Malackowski | A61B 34/30 |
| | | | 700/258 |
| 2016/0039093 A1* | 2/2016 | Abdallah | B25J 9/1687 |
| | | | 700/257 |
| 2016/0214261 A1* | 7/2016 | Davis | B25J 13/085 |
| 2018/0043525 A1* | 2/2018 | Su | B25J 9/0081 |

* cited by examiner

REDUNDANT UNDERACTUATED ROBOT WITH MULTI-MODE CONTROL FRAMEWORK

INTRODUCTION

The present disclosure relates to robotic systems having a robot and an associated controller configured to work collaboratively with a human operator through physical interaction, e.g., a lift-assist device designed to support the weight of a payload while the operator positions the payload. Machine control may be achieved in response to electronic control signals, e.g., from a human-machine interface or a machine-machine interface of an automation system. In some machine configurations, the operator manually acts on the task load while performing dexterous actions while machinery supports and grossly positions the load. Other configurations may be envisioned in which the robot autonomously moves the load without direct physical interaction with the load by the operator.

SUMMARY

A system and associated control framework are disclosed herein for use with tasks involving a robotic mechanism configured to act on an object or the surrounding environment. As used herein, the term "robotic system" refers to an underactuated jointed mechanism with redundant degrees of freedom (DOF). "Underactuated" in the present disclosure means a jointed mechanism in which not all of the joints of the mechanism are actuated, i.e., some of the joints are passive or unactuated. "Redundant" refers to a jointed mechanism having more than the minimum number of joints needed based on the Cartesian DOF of an end-effector of the jointed mechanism, with the end-effector referring to a point of application of the jointed mechanism, e.g., the particular structure that grasps the object, is held by the operator, or that applies a regulated force to the object or environment, or the point whose position is of interest to the task. In other words, the jointed mechanism has extra joints that produce motion in the same Cartesian DOF. Fundamentally, the passive joints would be redundant to a set of active joints, and would lie distally with respect to (e.g., apart from and downstream of) such a set of active joints. The end-effector may be configured such that an operator is able to physically interact with the end-effector or other parts of the jointed mechanism and an external object or surface to perform a manual work task, doing so collaboratively with the jointed mechanism.

The control framework disclosed herein may use a controller that, in some embodiments, regulates the force and/or controls the position of the end-effector, and that may be applied to different modes of operation. A first mode, referred to herein as a Collaborative Mode, may be used when the jointed mechanism is intended to physically interact with the operator to complete a task in collaboration with controlled operation of the jointed mechanism. The second mode, referred to herein as Autonomous Mode, is used when the jointed mechanism is intended to independently complete a task without the direct physical interaction of the operator with the end-effector. With respect to the term "impedance" as used herein, this term refers to the force a system provides in resisting motion. Impedance control thus refers to active control of the robotic system to provide a desired force in resisting such motion in its different orders, where stiffness is the resistance to position, damping is the resistance to velocity, and inertia is the resistance to acceleration, resulting in a $2^{nd}$-order response characteristic of a mass-spring-damper system.

In an example embodiment, the controller is specially programmed to situationally operate the jointed mechanism in one of the two different control modes noted above, i.e., Cooperative Control Mode or Autonomous Mode. Optionally, force control may be used in either control mode to enable the end-effector to apply a particular regulated force to the environment. In the Cooperative Control Mode, the operator and the jointed mechanism both physically act on the end-effector. In the Autonomous Mode, the operator does not physically interact with the end-effector. Instead, the controller autonomously controls a position of the jointed mechanism, or more specifically, of the end-effector. When the force control option is added, the end-effector is able to impart a regulated external force to the object or the surrounding environment.

Central to one aspect of the present approach is the programmed operational function of the controller, which controls the jointed mechanism as if the jointed mechanism is embodied as a classic mass-spring-damper system. In this manner, the controller closely regulates precisely how the jointed mechanism responds to particular forces and the characteristic response, such as being underdamped or overdamped, as such terms are known in the art. Stiffness and/or damping parameters of the modeled mechanism may be manipulated via a controller, with an upper limit potentially set on static forces imparted to the object or environment. For example, the modelled spring force or the regulated force would have an upper bound on their value. Hence, the steady-state force will not exceed a bound.

When operating in the Autonomous Mode, if the end-effector happens to contact structure or an operator in the surrounding environment, the controller may automatically initiate an appropriate response, such as switching or transitioning to the Cooperative Control Mode or executing an emergency stop (e-stop) action. Position sensors may be used with each passive joint of the end-effector, with the controller optionally configured to detect contact with the system based on a deviation of a measured joint position from an expected position, i.e., based on known kinematic/dynamic relationships, via force sensors, or using other suitable approaches.

In certain embodiments, the jointed mechanism may include a relatively large "macro-mechanism" that includes all of the actively-driven (actuator-driven) joints of the jointed mechanism. Such a macro-mechanism may be placed proximally in series with a smaller, relatively light-weight "mini" mechanism. The mini mechanism may have only passive joints, which may be linear/translational in various directions and/or rotational, and which in turn may be adjusted solely by forces that are input to the end-effector by the operator or by contact with the environment. The passive joints are restored to an equilibrium position using a passive restoring force, for instance from a spring or gravity.

The jointed mechanism may be functionally represented as a classic cart and pendulum system with gravity or springs used as a restoring force, i.e., a force returning the end-effector to an equilibrium position. The dynamics of such a system may be modeled in the controller described herein, with the Autonomous Mode and the Cooperative Control Mode programmed as two distinct operating modes available to the controller or to the operator as the situation dictates. Impedance control may be used to act as a single control framework for both control modes, which facilitates autonomous transitioning between the available control modes. A control decision is then made by the controller in real time as to the optimal behavior for the robot or macro-mechanism to follow.

In a particular embodiment, a robotic system for performing a work task includes a jointed mechanism, joint position sensors, and a controller. The jointed mechanism has a plurality of actively-controlled joints and a plurality of passive joints, with the passive joints being redundant with the actively-controlled joints. The jointed mechanism also includes an end-effector connected to and distally disposed with respect to the passive joints, i.e., positioned or situated a distance away from the passive joints. The controller is in communication with the position sensors, and is programmed to selectively control the actively-controlled joints in response to the measured joint positions using a modeled impedance of the robotic mechanism. The controller does so in a plurality of control modes, including an Autonomous Mode and a Cooperative Control Mode. An operator does not physically interact with the end-effector in performing the work task in the Autonomous Mode, and does physically interact with the end-effector in the Cooperative Control Mode.

A method for controlling the robotic system includes measuring joint positions of the passive joints using a plurality of position sensors, and then transmitting the measured joint positions to a controller programmed with a modeled impedance of the robotic mechanism. Additionally, the method includes selectively controlling the actively-controlled joints in response to the measured joint positions in a plurality of control modes using the modeled impedance. As noted above, the control modes including the Autonomous Mode and the Cooperative Control Mode.

In another embodiment, the robotic system includes a jointed mechanism having a plurality of actively-controlled joints and a plurality of passive joints, an end-effector connected to and positioned distally of the passive joints, and a plurality of position sensors operable for measuring joint positions of the passive joints. The robotic system further includes a controller in communication with the position sensors. The controller in this embodiment is programmed to selectively control a position of the actively-controlled joints in response to the measured joint positions to thereby apply a regulated force via the end-effector. Force control may be used alone or in conjunction with the Autonomous and Cooperative Control Modes in an impedance control framework of the type noted above.

The above features and advantages, and other features and advantages of the present disclosure, will be readily apparent from the following detailed description of the embodiment(s) and best mode(s) for carrying out the disclosure when taken in connection with the accompanying drawings and appended claims.

DETAILED DESCRIPTION

Several embodiments of the disclosure are illustrated in the accompanying drawings. The same or similar reference numerals are used in the drawings and the description to refer to the same or similar structure. The drawings are in simplified form and are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure.

Figure 1:
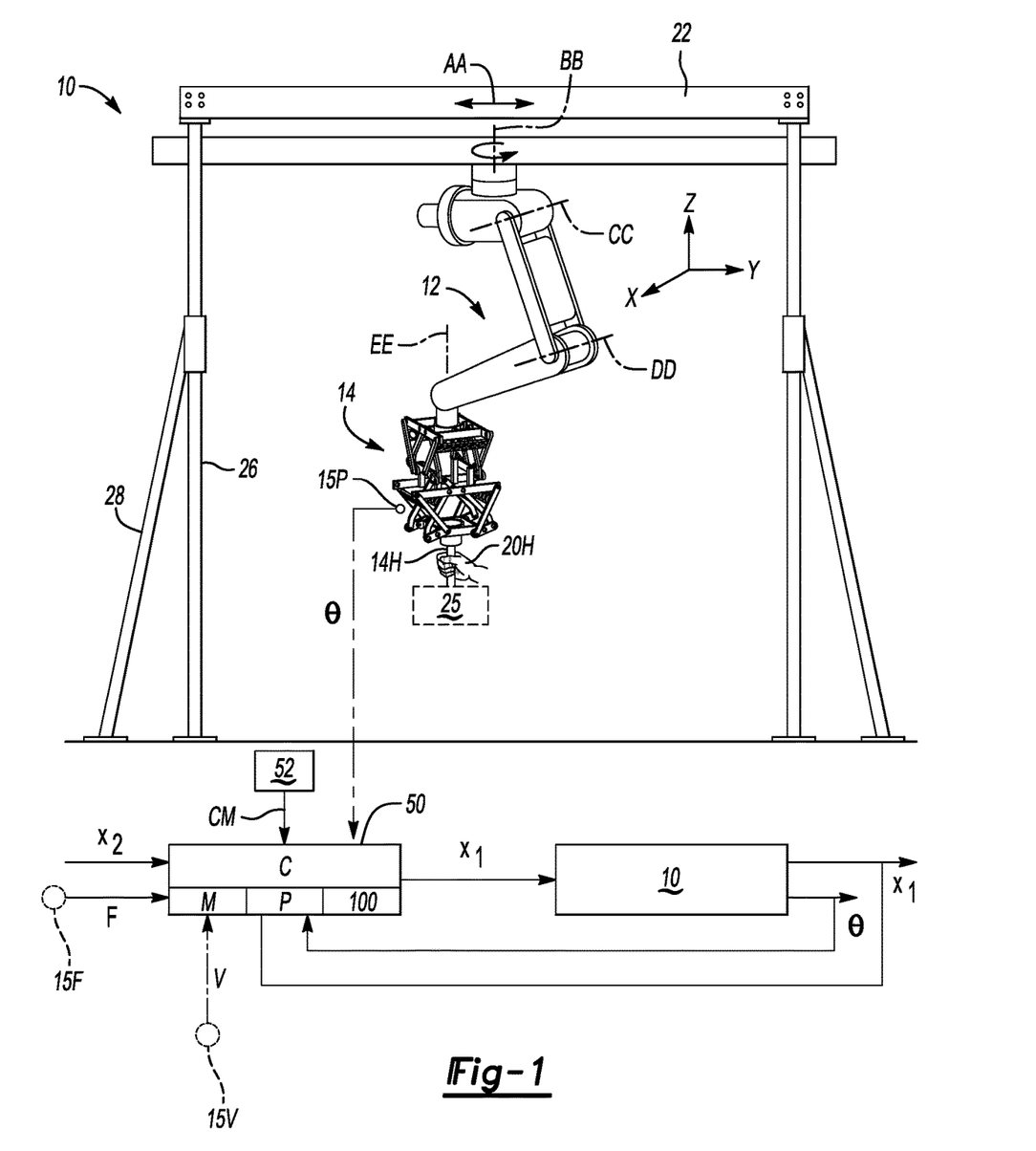
FIG. 1 is a schematic illustration of a robotic system utilizing a controller with a redundant, underactuated mechanism according to an embodiment of the disclosure.

An example robotic system 10 is shown in FIG. 1 that is configured, cooperatively with a human operator 20H (only the hand of which is shown for simplicity), to support and control a position of a payload, work tool, or other object 25. The robotic system 10 includes a jointed mechanism 12 that contains all of the joints, and thus all available control degrees of freedom (DOF), of the robotic system 10. In some embodiments, the jointed mechanism 12 may include a relatively large "macro" mechanism, e.g., a multi-axis robot as shown, which in turn may be connected to a passive "mini" mechanism 14 to form a macro-mini robotic mechanism. The mini mechanism 14 may include an end-effector 14H, which may be a particular portion of the jointed mechanism 12 that serves as the point of application for a given task, e.g., the particular structure of the jointed mechanism 12 that grasps the object 25, is held by the operator 20H, or applies a force to the environment of the object 25. The jointed mechanism 12 thus provides the robotic system 10 with multiple control DOF, some of which are actively controlled ("active DOF") and some of which are free to move in response to forces from an operator or the environment, i.e., "passive DOF."

In the non-limiting embodiment shown in FIG. 1, the jointed mechanism 12 includes overhead support beams 22 having an active/actuated linear positioning mechanism, e.g., a two linear DOF gantry or overhead bridge crane possibly supported by vertical and angled support beams 26 and 28, respectively. In such an embodiment, movement of the jointed mechanism 12 along the overhead support beams 22 in the direction of arrow AA may be actuated via motors, chains, belts, or the like (not shown) so that the end-effector 14H and the object 25 are able to translate along the overhead support beams 22 as needed. Likewise, rotational motion around axis BB normal to the direction of translation (arrow AA) may be provided by similar devices. The jointed mechanism 12 may include multiple other axes, e.g., CC, DD, and EE, with linear and/or rotational motion occurring within a typical three-dimensional Cartesian XYZ reference frame.

The mini mechanism 14, a non-limiting example of which is shown in FIG. 1 and disclosed in U.S. application Ser. No. 15/284,043 filed on Oct. 3, 2016 which is hereby incorporated by reference in its entirety, is an example configuration providing one or more passive DOF. Each passive DOF, or more precisely each joint whose range of motion corresponds to a given passive DOF, includes a corresponding joint position sensor 15P configured to measure a position of a corresponding translational and/or rotational joint of the mini mechanism 14 and output data in the form of joint positions (arrow θ) as part of the ongoing function of the robotic system 10, with one such joint position sensor 15P shown in FIG. 1 for illustrative simplicity. Optional additional sensors generating different types of data may include force sensors 15F detecting or measuring force data (arrow F) and/or vision sensors 15V detecting or measuring vision data (arrow V), e.g., image-based positional data captured via one or more digital cameras, video records, or the like.

The robotic system 10 includes a controller (C) 50, which in some embodiments is an impedance controller of the type described below. The controller 50 may be programmed to receive such data during a manual work task and identify an occurrence of an error or a completion of the manual task using the received data. The controller 50 may be embodied as one or more digital computers having a processor (P) and memory (M). The memory (M) includes sufficient amounts of tangible, non-transitory memory, e.g., read only memory, flash memory, optical and/or magnetic memory, electrically-programmable read only memory, and the like. Memory (M) also includes sufficient transient memory such as random access memory, electronic buffers. Hardware of the controller 50 may include a high-speed clock, analog-to-digital and digital-to-analog circuitry, and input/output circuitry and devices, as well as appropriate signal conditioning and buffer circuitry.

Figure 2:
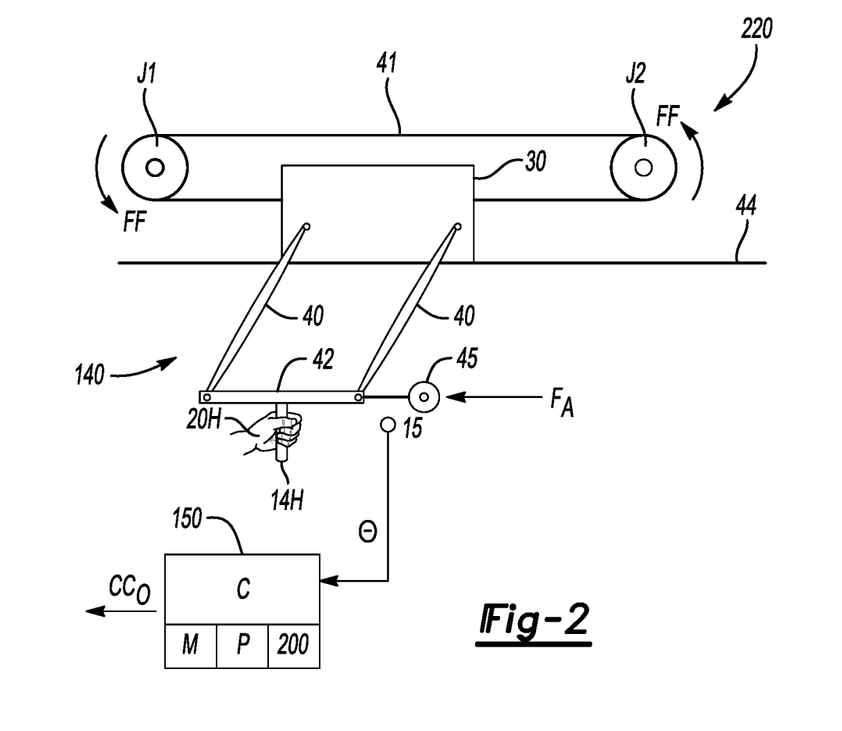
FIG. 2 is a schematic illustration of an example single degree of freedom (DOF) redundant, underactuated mechanism usable with the robotic system of FIG. 1 or as part of an optional force-controlled architecture.

The memory (M) may be programmed with computer-readable instructions 100 enabling the controller 50 to control active joints, brakes, and/or locking mechanisms of the robotic system 10 as needed to execute and switch between the available control modes (arrow CM) noted above, i.e., the Autonomous Mode and the Cooperative Control Mode, with force control modes also available or, in the example embodiment of FIG. 2, available separately. An interface 52, e.g., human-machine such as a touch screen or machine-machine in logic, may be used to facilitate determination of the control modes (arrow CM), e.g., by an operator manually selecting one of the control modes or the controller 50 may determine and select the optimal control mode in real time based on detected interactions with the end-effector 14H. As explained below, the controller 50 may receive a desired position (arrow $x_2$), generate and transmit a commanded position ($x_1$) to the robotic system 10, and receive the measured joint positions (arrow θ) as position feedback in the overall control of the robotic system 10.

Referring briefly to FIG. 2, an example jointed mechanism 220 may be used with the impedance controller 50 of FIG. 1 and/or with a force controller ($C_F$) 150 as shown in FIG. 2, with the force controller 150 having memory (M) and a processor (P) as with the controller 50 of FIG. 1. Also like the jointed mechanism 12 of FIG. 1, the jointed mechanism 220 of FIG. 2 may include multiple active joints, depicted in FIG. 2 as rotary joints J1 and J2 which rotate in the direction of arrows FF, and in the opposite direction as needed, in order to move a belt 41 or other suitable drive mechanism. Attached to the belt 41 is a cart 30 which may be translated with respect to a surface 44 via controlled operation of the active DOFs. A mini mechanism 140 in the form of a passive single or double parallelogram arrangement having parallel arms 40 and a cross member 42 is connected to the parallel arms 40 may be attached to and suspended from the cart 30. An end-effector 45, e.g., a roller, may be moved by the operator 20H and configured to impart a force (arrow $F_A$), such as in the example of a rolling force in a rolling operation of the type used to spread and expel adhesive material from a panel assembly (not shown).

The controller 150 in such an embodiment may receive joint position signals (arrow θ) from a corresponding position sensor 15P and, using the recorded instructions 200, perform an error-proofing operation resulting in an output signal (arrow CCo). By way of example, some operations require a manual application of force, such as the example panel adhesive operation noted above. Variation in the force applied via an actuator 45 may result in differences in adhesion quality around a perimeter of such a panel. By using force control with the jointed mechanism 220 with the mini mechanism 140 as a redundant, underactuated robotic system alternative to the robotic system 10 of FIG. 1, either alone or using the structure of FIG. 2 with the impedance controller 50 of FIG. 1, it may be possible to verify the forces applied to the panel, compare such forces to calibrated force thresholds, and thereby error proof the operation while also assisting the operator in the performance of a largely manual task. The output signal (arrow CCo) in such an embodiment may activate a signal lamp, generate a message indicative of the location and amount of a potential variation of an applied force from the calibrated force, etc. During such action, the controller 50 may also detect contact with the object 25 or the environment based on a deviation of the measured joint motion from an expected joint motion. As used herein, the term joint motion may encompass position, velocity, and/or acceleration. Automatic control actions may thereafter be executed in response to the detected contact, such as switching over to the Cooperative Control Mode or executing an emergency stop (e-stop) action.

As will be now be described with particular reference to FIGS. 3A-4, the example impedance controller 50 of FIG. 1 is configured to provide a single intuitive control formulation for use with a redundant underactuated robotic mechanism such as the jointed mechanism 12 of FIG. 1 or the alternative jointed mechanism 220 shown in FIG. 2. The controller 50 may achieve its programmed functionality using a linear or a cart-pendulum model of the end-effector 14H and the object 25, with the linear approach described with reference to FIG. 3A and the cart-pendulum approach described with reference to FIG. 3B.

A moving cart-pendulum system may be exemplified as the overhead configuration of FIGS. 1 and 2. As shown in FIG. 1, part of the present approach, the controller 50 may receive or determine the appropriate control mode (arrow CM), and also determine input forces (arrow F) to the end-effector 14H and the desired position (arrow $x_2$) of the object 25. The controller 50 may output the commanded position (arrow $x_1$) as an electronic signal to joint actuators/associated joint motor control processors the robotic system 10. The measured positions (θ), e.g., the various joint angles of the robotic system 10, are fed back to the impedance controller 50. The controller 50 then executes the following control logic, embodied as the instructions 100, in achieving the desired control goals.

Impedance Control Law

The behavior of the robotic system 10 may be modeled in logic of the impedance controller 50 of FIG. 1 as a linear mass-spring-damper system producing a desired $2^{nd}$ order behavior. In such a mass-spring-damper system, a force may be applied to a mass (m), with the controlled dynamics of an end-effector of such a modeled robotic system 10 represented as:

$$m\ddot{x}+b\dot{x}+k\Delta x=\Delta F$$

with Δx being the change in a position (x) of the mass (m) in response to a change in force (ΔF). Thus, using impedance control of the controller 50 of FIG. 1, the stiffness of an interaction can be specified in logic of the controller 50. For instance, impedance may be modeled as a spring-mass-damper system having stiffness and damping parameters, with the controller 50 programmed to control the jointed mechanism 12 by manipulating a stiffness and/or a damping parameter as described below.

The present approach is based on a computer technique formulation, and thus applies to both control modes of the controller 50 without requiring linearization or estimation of the force. Moreover, the present approach operates directly in the operational space of the end-effector 14H of FIG. 1, not in the joint space, thereby facilitating dynamic analysis of interactions with an operator. The same approach facilitates simple position control of the end-effector 14H without requiring double integration of an acceleration command.

Linear Model

Figure 3A:
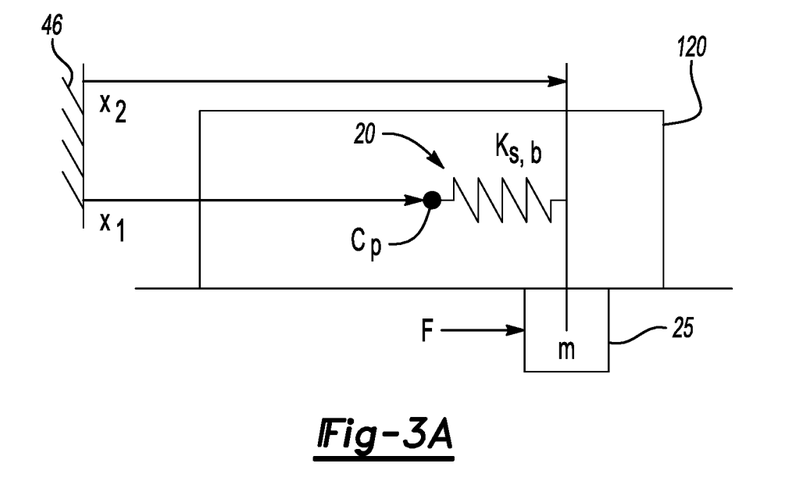
FIGS. 3A and 3B are respective linear and non-linear single DOF models of the robotic system shown in FIG. 1, with either or both models usable by the impedance controller of FIG. 1.

Referring to FIG. 3A, the mass (m) may be represented as being connected to a cart 120 via a spring 20 having a spring constant ($k_s$), with the schematic cart 120 corresponding the jointed mechanism 12 or macro mechanism of the robotic system 10. The spring 20, represented as being connected in such a model to a stationary member 46 and a center point (Cp) of the cart 120, also has a damping coefficient (b). Force (arrow F) may be applied to the mass (m). Δx noted above is therefore equal to $x_2 - x_1$ in FIG. 3A. The robotic system 10 of FIG. 1 uses gravity as a type of pendulum for the restoring force when the mass (m), i.e., the object 25 of FIG. 1, is released. Thus, a desired impedance relationship for the end-effector may be modeled or represented as:

$$m\ddot{x}_2 + b\dot{x}_2 + F_{ss} = F \quad (1)$$

$$F_{SS} = \begin{cases} k(x_2 - x_2^*), & \text{Autonomous} \\ F^*, & \text{Cooperative} \end{cases} \quad (2)$$

where m is the mass of the end-effector 14H, b is the desired damping coefficient, k is the desired stiffness, i.e., the actively-controlled effective stiffness, and $x_2^*$ is the reference position of the mass (m). F in the above-noted formulation is the external force on the mass (m) from the operator and F* is the commanded force from the controller 50. The steady-state force Fss is thus determined as noted in equation (2) differently in the Autonomous Mode and the Cooperative Control Mode.

Force analysis on the end-effector 14 of FIG. 3A provides the following equation of motion, neglecting friction:

$$m\ddot{x}_2 = F + k_s(x_1 - x_2) \quad (3)$$

where $k_s$ is the actual physical stiffness of the spring 20 used in the model (a constant). Assuming the jointed mechanism 12/cart 120 employs a $1^{st}$ order position controller:

$$\dot{x}_1 = -k_p(x_1 - x_1^*) \quad (4)$$

where $k_p$ is a proportional gain and $\dot{x}_1$ is proportional to error in position of the cart 120/robot 12. Solving from equations (1) and (2), the control law for the desired macro position follows as:

$$x_1^* = x_2 - \frac{b}{k_s}\dot{x}_2 - \frac{1}{k_s}F_{ss} \quad (5)$$

Closed-Loop Dynamics

Assuming a perfect $1^{st}$ order controller, the dynamics of the jointed mechanism 12 follows:

$$\frac{x_1}{x_1^*} = \frac{1}{\alpha s + 1} \quad (6)$$

where $\alpha = \frac{1}{k_p}$.

In the Autonomous Mode, closed-loop dynamics may be provided from equations (3), (5), and (6) in the Laplace domain as follows:

$$ms^2 x_2 = F - k_s(x_2 - x_1) \quad (7)$$

$$(ms^2 + k_s)x_2 = F + \frac{k_s}{\alpha s + 1}x_1^*$$

$$(\alpha m s^3 + ms^2 + \alpha k_s s + bs + k)x_2 = kx_2^* + (\alpha s + 1)F$$

When operating in the Autonomous Mode, the controller 50 is concerned with the position of the end-effector 14. Thus, the following transfer function follows, assuming F=0:

$$\frac{x_2}{x_2^*} = \frac{k}{\alpha m s^3 + ms^2 + (b + \alpha k_s) + k} \quad (8)$$

As the jointed mechanism 12 speeds up, i.e., as a becomes smaller, the transfer function of equation (8) approaches the desired $2^{nd}$ order response behavior.

Figure 5:
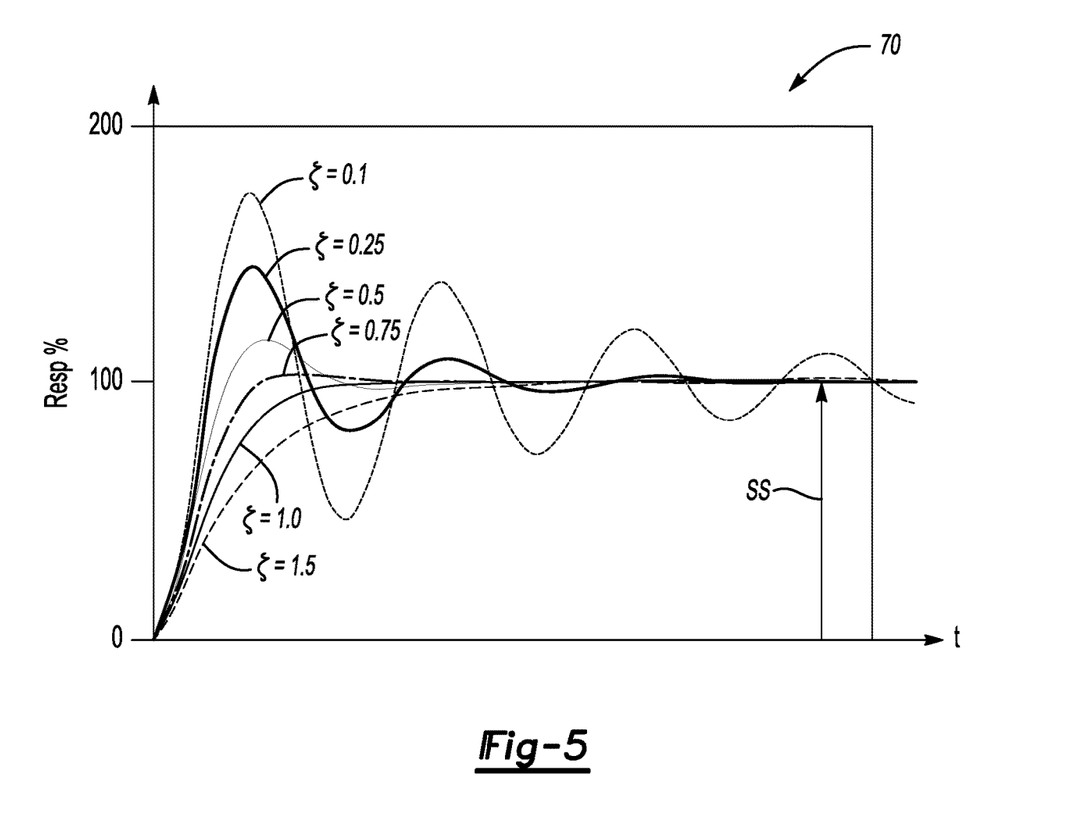
FIG. 5 is a time plot depicting the dynamic effects of damping on the jointed mechanism described herein, with a percentage of damping response plotted on the vertical axis and time plotted on the horizontal axis.

As noted above, impedance control offers the opportunity to model the behavior of an active system like that of a simple mass-spring-damper system to obtain the desired $2^{nd}$ order response behavior. The dynamic response of such a mass-spring-damper system is shown schematically in the response plot 70 of FIG. 5. The position is depicted on the vertical axis as percentage of the input (Resp %), with time (t) plotted on the horizontal axis. ζ, the damping factor, depicts the an under-damped condition when is in a range of 0 to around 0.75, e.g., 0.1, 0.25, 0.5, and 0.75 as shown, with a steady-state damping response indicated by arrow SS. ζ=1.0 represents a critically-damped condition. ζ=1.5 representing an over-damped condition. Thus, modeling and controlling the system 10 described above as a mass-spring-damper system allows a desired control response to be achieved via the controller 50. For instance, the controller 50 may be programmed to control the jointed mechanism 12 in the Autonomous Mode so that the end-effector 14H or another end-effector connected to and positioned distally from passive joints of the jointed mechanism 12 does not exhibit under-damped oscillations.

In the Cooperative Control Mode, intuitiveness of control is of primary concern to the controller 50 of FIG. 1. This entails evaluation of the motion response for a given input force. The following transfer function thus follows, where F*=0:

$$\frac{\dot{x}_2}{F} = \frac{\alpha s + 1}{\alpha m s^2 + ms + b + \alpha k_s} \quad (9)$$

In this case, as the jointed mechanism 12 speeds up, the response approaches a $1^{st}$ order response. Such $1^{st}$ order behavior, without oscillations of the mass (m) or the end-effector 14H, is a targeted behavior to result in the most intuitive interaction for cooperative manipulation. Speeding up the jointed mechanism 12 reduces the severity of oscillations for an overdamped behavior without reducing response time.

Figure 4:
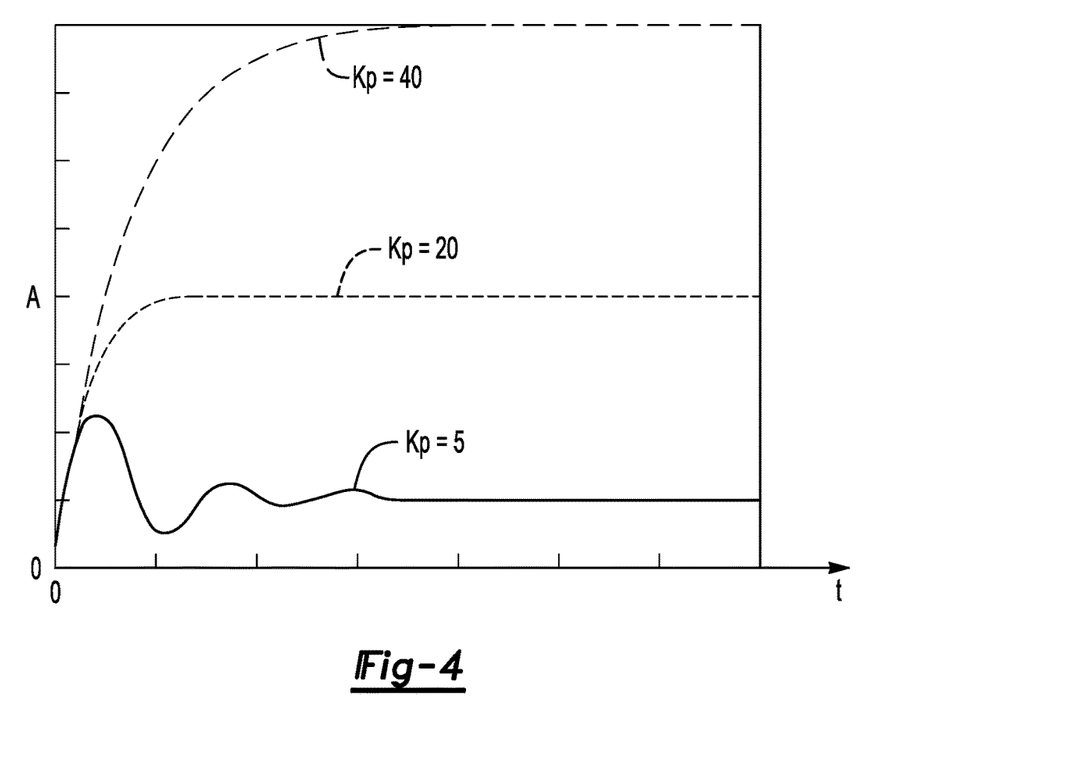
FIG. 4 is a time plot of a velocity response for the representative cart and pendulum model of the end-effector as shown in FIG. 3B, with gain amplitude depicted on the vertical axis and time depicted on the horizontal axis.

Referring to FIG. 4, an example step response is shown for the robotic system 10 of FIG. 1, where the m=1 and $k_s$=100. Increasing the gain of the controller 50 dampens out the response without slowing the response down. Such behavior, without oscillations, makes manipulation of the object 25 by the operator more intuitive. This response also represents the impulse response for position. Additionally, a proportional gain $k_p$ with a larger amplitude (A) increases the steady-state gain, with examples of $k_p$=5, $k_p$=20, and $k_p$=40 depicted in FIG. 4. The steady-state gain of the robotic system 10 may be represented as $$\frac{k_p}{bk_p + k_s}.$$

Hence, increasing the value of $k_p$ also increases the low-frequency gain of the robotic system 10. In other words, less force is required to achieve the same velocity.

It is desirable to have the jointed mechanism 12 respond as quickly as possible, given the $1^{st}$ order position follower behavior demonstrated above. The faster the jointed mechanism 12 can respond, the more intuitive an interaction with an operator will be, and with less effort required. In Autonomous Mode, the damping coefficient b adds damping to reduce oscillations, which may be desirable. In Cooperative Mode, the damping coefficient b adds effective stiffness to the response. It thus increases the tendency to oscillate, which is generally undesirable. It also decreases the steady-state gain, which may be beneficial as explained below. It can be shown that a window of damping exists that allows both control modes to be overdamped with the same b value. Otherwise, different values can be used for each control mode.

Non-Linear Model

Figure 3B:
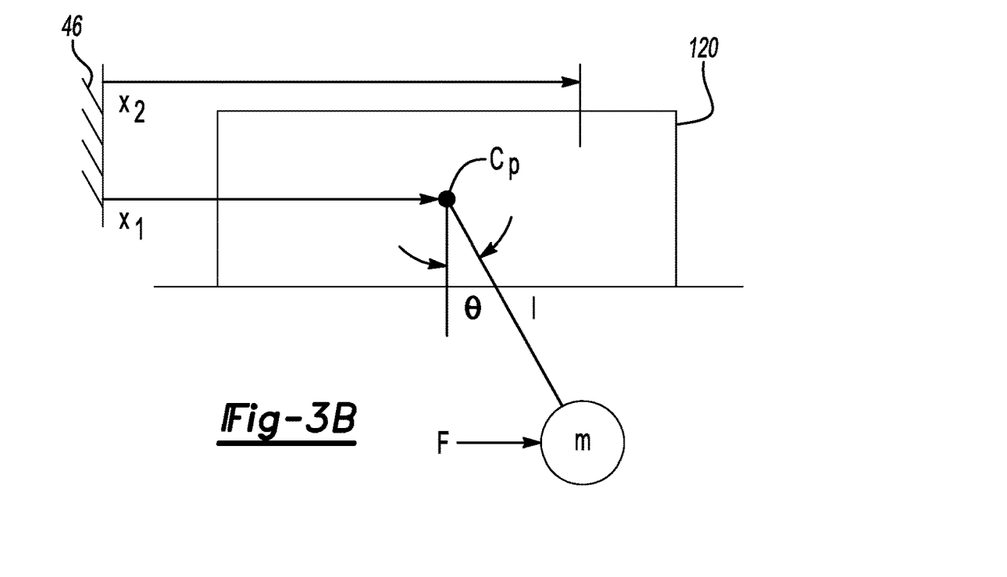

Referring to FIG. 3B, a cart-pendulum model may be used for the mini mechanism 14 where gravity provides the restoring force. The equation for motion for a cart-pendulum system may be represented as follows, with g being the gravitational constant:

$$0 = \ddot{x}_2 + \dot{\theta}^2 l \sin\theta + (\cos^2\theta - 1)\ddot{x}_1 + g \sin\theta \cos\theta \quad (10)$$

Here, l is the length of the pendulum shown in FIG. 3B. To solve for the control law, the term $(\cos^2 \theta - 1)\ddot{x}_1$ may be assumed to be insignificant. Small angles or small accelerations are deemed present. This allows the controller 50 to control the impedance of the mini mechanism 14 using the position of the jointed mechanism 12 as follows:

$$0 = \ddot{x}_2 + \dot{\theta}^2 l \sin\theta + g\sin\theta\cos\theta \quad (11)$$
$$0 = \ddot{x}_2 + \left(\dot{\theta}^2 + \frac{g}{l}\cos\theta\right) l \sin\theta$$

Since $l \sin \theta = x_2 - x_1$, the desired acceleration can be found from the impedance relationship (1) noted above. Solving for the control law:

$$x_1^* = x_2 - \frac{b}{k_{pend}}\dot{x}_2 - \frac{1}{k_{pend}}F_{ss} \quad (12)$$

where $k_{pend} = m\left(\dot{\theta}^2 + \frac{g}{l}\cos\theta\right).$

The parallel to relationship (5) above is thus apparent.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. A robotic system comprising:
a jointed mechanism having a plurality of actively-controlled joints and a plurality of passive joints that are redundant with the actively-controlled joints;
an end-effector connected to and distally disposed with respect to the passive joints;
a plurality of position sensors operable for measuring joint positions of the passive joints; and
a controller in communication with the position sensors, and programmed to selectively control the actively-controlled joints in response to the measured joint positions in a plurality of control modes using a modeled impedance of the robotic system in which the robotic system is modeled as a spring-mass-damper system having a stiffness parameter and a damping parameter, the control modes including an Autonomous Mode in which an operator does not physically interact with the end-effector during operation of the robotic system and a Cooperative Control Mode in which the end-effector is configured to be physically interacted with by the operator during operation of the robotic system, wherein the controller is further configured to execute force control over the end-effector in one or both of the Autonomous Mode and the Cooperative Control Mode to thereby regulate a force applied by the end-effector to an object, and to control the jointed mechanism by manipulating at least one of the stiffness parameter and the damping parameter.

2. The robotic system of claim 1, wherein the controller is configured to detect a contact with the robotic system when operating in the Autonomous Mode, and to automatically initiate a control action in response to the detected contact.

3. The robotic system of claim 2, wherein the control action is an automatic transition from the Autonomous Mode to the Cooperative Control Mode.

4. The robotic system of claim 2, wherein the controller is programmed to detect the contact based on a deviation of a measured joint motion from an expected joint motion.

5. The robotic system of claim 1, wherein the controller is programmed to control the jointed mechanism in the Autonomous Mode so that the end-effector does not exhibit under-damped oscillations.

6. A method for controlling a robotic system having a jointed mechanism that includes a plurality of actively-controlled joints, a plurality of passive joints that are redundant with the actively-controlled joints, and an end-effector connected to and positioned distally with respect to the passive joints, the method comprising:
measuring joint positions of the passive joints using a plurality of position sensors;

transmitting the measured joint positions to a controller;

selectively controlling the actively-controlled joints via the controller in response to the measured joint positions using a modeled impedance of the robotic system in which the robotic system is modeled as a spring-mass-damper system having a stiffness parameter and a damping parameter, including manipulating at least one of the stiffness parameter and the damping parameter, and using a plurality of control modes, the control modes including an Autonomous Mode in which an operator does not physically interact with the end-effector and a Cooperative Control Mode in which the end-effector is configured to be physically interacted with by the operator; and executing force control over the end-effector in one or both of the Autonomous Mode and the Cooperative Control Mode to thereby limit a force applied by the end-effector to an object.

7. The method of claim 6, further comprising applying a regulated force to an object via the end-effector while operating in the Autonomous Mode or in the Cooperative Control Mode.

8. The method of claim 6, further comprising detecting contact with the robotic system when operating in the Autonomous Mode, and automatically initiating a control action via the controller in response to the detected contact.

9. The method of claim 8, wherein automatically initiating the control action includes transitioning from the Autonomous Mode to the Cooperative Control Mode.

10. The method of claim 8, wherein detecting the contact is based on a deviation of a measured joint motion from an expected joint motion.

11. The method of claim 6, further comprising controlling the jointed mechanism via the controller when operating in the Autonomous Mode such that the end-effector does not exhibit under-damped oscillations.

12. A jointed robotic system comprising:
a jointed mechanism having a plurality of actively-controlled joints and a plurality of passive joints;
an end-effector connected to and positioned distally with respect to the passive joints and configured to apply a regulated force to an object, wherein the end-effector is configured for physical interaction with an operator during a Cooperative Control Mode;
a plurality of position sensors operable for measuring joint positions of the passive joints; and
a controller in communication with the position sensors, and programmed to selectively control a position of the actively-controlled joints using a modeled impedance of the robotic system in response to the measured joint positions to thereby command application of the regulated force to the object via the end-effector;
wherein the modeled impedance is modeled via the controller as a spring-mass-damper system having stiffness and damping parameters, and wherein the controller is programmed to control the jointed mechanism by manipulating at least one of the stiffness parameter and the damping parameter and to execute force control over the end-effector in the Cooperative Control Mode to thereby limit a force applied by the end-effector to the object.

13. The robotic system of claim 12, wherein the controller is programmed to control the actively-controlled joints of the jointed mechanism in an Autonomous Mode so that the end-effector does not exhibit under-damped oscillations.

14. The robotic system of claim 12, wherein the controller is programmed to receive data during the work task, and to identify an occurrence of an error or a completion of the work task using the received data.

15. The robotic system of claim 14, wherein the data includes at least one of position data, force data, and vision data.

* * * * *